(12) United States Patent
Zhang

(10) Patent No.: US 10,845,331 B2
(45) Date of Patent: Nov. 24, 2020

(54) METHOD FOR OPERATING AN INTERNAL COMBUSTION ENGINE

(71) Applicant: Continental Automotive GmbH, Hannover (DE)

(72) Inventor: Hong Zhang, Tegernheim (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 143 days.

(21) Appl. No.: 16/098,009

(22) PCT Filed: Apr. 20, 2017

(86) PCT No.: PCT/EP2017/059322
§ 371 (c)(1),
(2) Date: Oct. 31, 2018

(87) PCT Pub. No.: WO2017/190957
PCT Pub. Date: Nov. 9, 2017

(65) Prior Publication Data
US 2019/0145928 A1    May 16, 2019

(30) Foreign Application Priority Data

May 2, 2016    (DE) .................. 10 2016 207 516

(51) Int. Cl.
*G01N 27/417*    (2006.01)
*F02D 41/24*    (2006.01)
(Continued)

(52) U.S. Cl.
CPC ....... *G01N 27/4175* (2013.01); *F02D 41/123* (2013.01); *F02D 41/144* (2013.01);
(Continued)

(58) Field of Classification Search
CPC .................................................. G01N 27/4175
See application file for complete search history.

(56) References Cited

U.S. PATENT DOCUMENTS

| 6,551,499 | B1 * | 4/2003 | Springhorn | .......... G01N 27/419 205/784.5 |
| 8,603,310 | B2 | 12/2013 | Ishida et al. | .................. 204/406 |

(Continued)

FOREIGN PATENT DOCUMENTS

| CN | 201666193 U | 12/2010 | ............. F02D 41/14 |
| CN | 102003295 A | 4/2011 | ............. F02D 41/14 |

(Continued)

OTHER PUBLICATIONS

Chinese Office Action, Application No. 201780027571.6, 19 pages, dated Jan. 20, 2020.

(Continued)

*Primary Examiner* — Paul M. West
*Assistant Examiner* — Mark A Shabman
(74) *Attorney, Agent, or Firm* — Slayden Grubert Beard PLLC

(57) ABSTRACT

Various embodiments of the teachings herein may include a method for operating an internal combustion engine having probe measuring a gas concentration of a gas mixture, said probe comprising a pump electrode, comprising: controlling a first pump current at the pump electrode to provide a resulting first pump voltage; controlling a second pump current at the pump electrode to provide a resulting second pump voltage, wherein the second pump voltage is greater than the first pump voltage; calculating an aging factor for the probe on the basis of the first pump current and the second pump current; and adapting operation of the internal combustion engine based on a characteristic of the probe corresponding to the calculated aging factor.

9 Claims, 1 Drawing Sheet

(51) Int. Cl.
*F02D 41/12* (2006.01)
*F02D 41/14* (2006.01)

(52) U.S. Cl.
CPC ....... *F02D 41/146* (2013.01); *F02D 41/1454* (2013.01); *F02D 41/2474* (2013.01); *F01N 2560/025* (2013.01); *F01N 2560/14* (2013.01)

(56) References Cited

U.S. PATENT DOCUMENTS

| | | | |
|---|---|---|---|
| 9,062,623 B2 | 6/2015 | Verdier et al. | |
| 9,151,203 B2 | 10/2015 | Marlett et al. | |
| 9,625,400 B2 | 4/2017 | Schneider et al. | |
| 2004/0103642 A1* | 6/2004 | Rosel | F02D 41/1454 60/274 |
| 2009/0095049 A1 | 4/2009 | Graupner et al. | 73/1.07 |
| 2013/0333677 A1* | 12/2013 | Surnilla | F02D 41/1454 123/674 |
| 2014/0121948 A1 | 5/2014 | Marlett et al. | 701/104 |
| 2015/0101327 A1 | 4/2015 | Clark et al. | 60/599 |
| 2016/0103095 A1* | 4/2016 | Surnilla | F02D 41/1456 205/784.5 |

FOREIGN PATENT DOCUMENTS

| | | | | |
|---|---|---|---|---|
| CN | 105298661 A | 2/2016 | ............. | F02D 41/00 |
| DE | 199 47 985239 A1 | 5/2001 | ........... | G01N 27/416 |
| DE | 103 12 440 A1 | 10/2004 | ............. | F01N 11/00 |
| DE | 10 2006 011 722 B3 | 4/2007 | ............. | F02D 41/14 |
| DE | 10 2012 206 476 A1 | 10/2013 | ........... | G01N 27/407 |
| DE | 10 2013 221 407 A1 | 4/2014 | ............. | F01N 11/00 |
| DE | 10 2015 117 119 A1 | 4/2016 | ............. | F02D 41/14 |
| EP | 3 075 994 A1 | 10/2016 | ............. | F02D 41/14 |
| FR | 2 852 627 B1 | 6/2005 | ............. | F01N 11/00 |
| JP | 622149 A | 1/1987 | ............. | F02D 41/00 |
| JP | 06148130 A | 5/1994 | ............. | G01N 27/41 |
| JP | 2010281732 A | 12/2010 | ............. | G01N 27/26 |
| JP | 2012531603 A | 12/2012 | ............. | F02D 41/22 |
| JP | 2013539043 A | 10/2013 | ............. | G01N 27/41 |
| JP | 2015125035 A | 7/2015 | ............... | F01N 3/00 |
| JP | 2016090264 A | 5/2016 | ............. | G01N 27/26 |
| WO | 2017/190957 A1 | 11/2017 | ............. | F02D 41/24 |

OTHER PUBLICATIONS

German Office Action, Application No. 10 2016 207 516.0, 6 pages, dated Mar. 27, 2017.
International Search Report and Written Opinion, Application No. PCT/EP2017/059322, 20 pages, dated Jul. 13, 2017.
Japanese Office Action, Application No. 2018557351, 4 pages, dated Oct. 15, 2019.
Usui, Toshio et al., "Humidity-Sensing Characteristics in Wet Air of a Gas Polarographic Oxygen Sensor Using a Zirconia Electrolyte," J. Electrochemical Soc., vol. 138, No. 2, pp. 585-588, Feb. 1991.
German Office Action, Application No. 102016207516.0, 8 pages, dated Jul. 15, 2020.

* cited by examiner

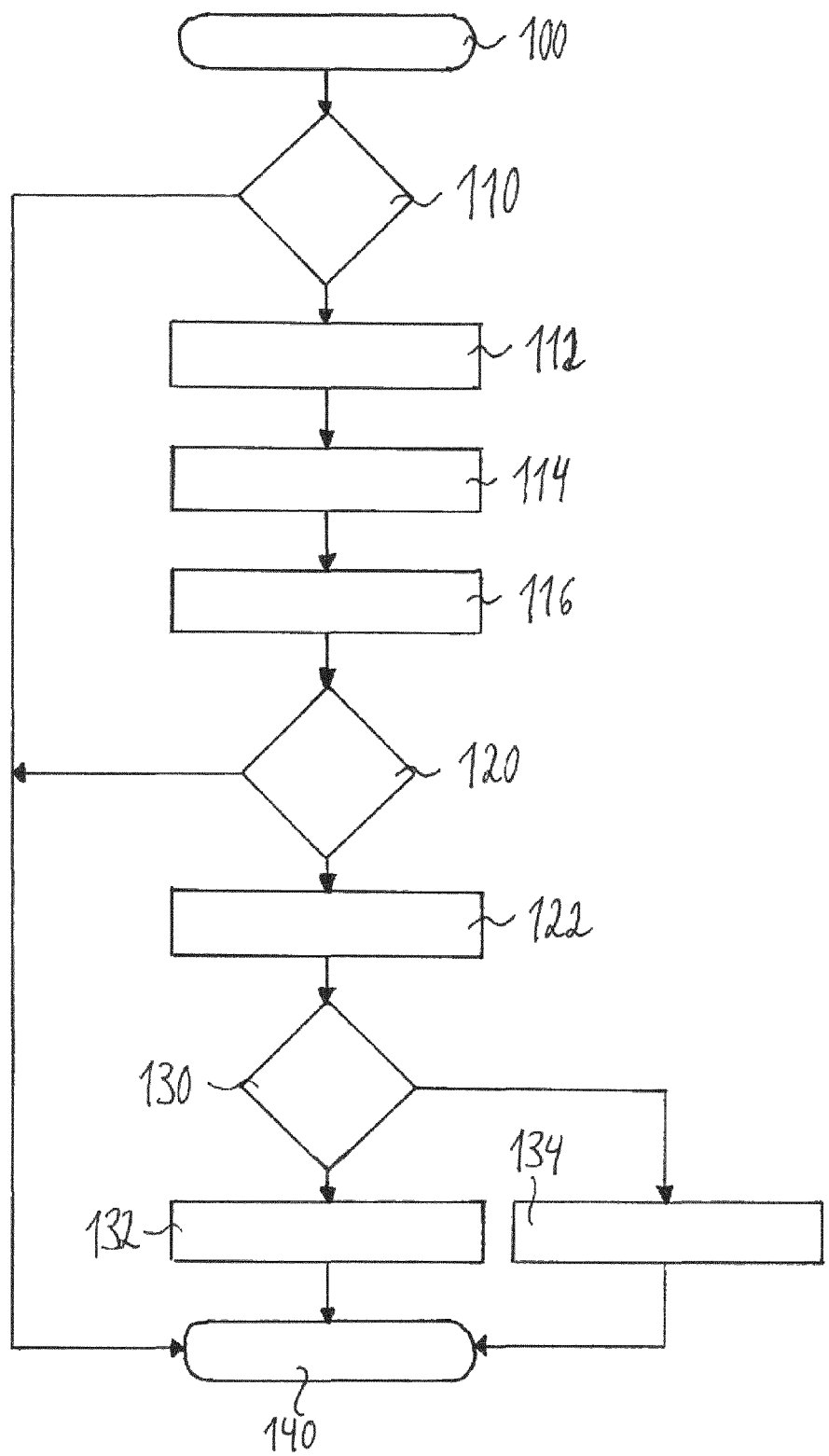

METHOD FOR OPERATING AN INTERNAL COMBUSTION ENGINE

CROSS-REFERENCE TO RELATED APPLICATIONS

This application is a U.S. National Stage Application of International Application No. PCT/EP2017/059322 filed Apr. 20, 2017, which designates the United States of America, and claims priority to DE Application No. 10 2016 207 516.0 filed May 2, 2016, the contents of which are hereby incorporated by reference in their entirety.

TECHNICAL FIELD

The present disclosure relates to internal combustion engines. Various embodiments may include methods for operating an internal combustion engine probe to establish a gas concentration of a gas mixture, including a method for establishing an aging factor for the probe and for adapting a characteristic of the probe on the basis of the established aging factor.

BACKGROUND

For the purposes of establishing a gas concentration of a gas mixture in an internal combustion engine, the use of specifically embodied probes, e.g., oxygen or nitrogen oxide sensors, is known so as to be able to set the operational parameters of the internal combustion engine in an optimized manner. However, these probes can age during the course of the operational duration; i.e., the measurement accuracy can deteriorate. This deterioration correspondingly leads to a deterioration of the control of the entire internal combustion engine.

The prior art has disclosed the adaptation of the characteristic of the probe during an overrun cut-off phase of the internal combustion engine. However, the oxygen concentration during the overrun cut-off phase depends strongly on the humidity present, and so the adaptation should preferably only be implemented at a low air temperature, where the influence of the humidity on the oxygen concentration is reduced.

DE 103 12 440 A1 has disclosed an emission control method for a lean internal combustion engine, in which regeneration operational phases are introduced on the basis of a model. Here, the model captures a state variable of a nitrogen oxide storage catalytic converter. Additionally, the concentration of nitrogen oxide compounds is determined downstream of the nitrogen oxide storage catalytic converter and this is linked to a model value for the nitrogen oxide storage catalytic converter, obtained from the model, for the purposes of forming a difference. An aging factor for the nitrogen oxide storage catalytic converter is determined with the aid of the difference value.

Further, DE 10 2006 011 722 B3 has disclosed a method for correcting the output signal of a lambda probe, in particular taking into account the humidity of the air suctioned by an internal combustion engine. The method known therefrom comprises identifying an overrun cut-off phase of the internal combustion engine and capturing an exhaust gas composition with the aid of the broadband lambda probe in the overrun cut-off phase such that the broadband lambda probe is able to be calibrated in relation to a known exhaust gas composition, capturing a humidity of air suctioned by the internal combustion engine and calculating a calibration factor of a characteristic of the broadband lambda probe including the captured exhaust gas composition and the captured humidity.

DE 10 2013 221 407 A1 discloses a method for adjusting an oxygen sensor measurement in an exhaust gas flow, emitted by a combustion engine, on the basis of the humidity. The method comprises monitoring a relative humidity of ambient air, which is obtained by a humidity sensor. A specific humidity at the oxygen sensor is modeled on the basis of the relative humidity. The oxygen sensor measurement is adjusted on the basis of the modeled specific humidity at the oxygen sensor.

DE 10 2012 206 476 A1 has proposed a method for operating a sensor element for capturing an oxygen component of a gas in a measurement gas space. The sensor element comprises at least a first electrode and at least a second electrode. The first electrode and the second electrode are connected by way of at least one solid electrolyte. The method comprises at least one vapor pressure determination step, in which at least one reference water vapor pressure is determined, and at least one calibration measurement step, in which at least one proportion of water vapor in the gas is determined in electrochemical fashion by means of the sensor element. A calibration of the sensor element is implemented using the reference water vapor pressure and the proportion of water vapor determined in the calibration measurement step.

US 2015/101327 A1 discloses a method and system for an oxygen sensor for accurately learning a zero point during selected operational conditions of the engine, during which no fuel is combusted. The learned zero point is used to derive the EGR flow and to correspondingly adjust the EGR valve. Moreover, a leaking EGR valve is diagnosed on the basis of the learned zero point.

SUMMARY

The teachings of the present disclosure may be embodied in a method for operating an internal combustion engine probe used to establish a gas concentration of a gas mixture, by means of which the probe can be operated in an optimized fashion. For example, some embodiments may include a method for operating an internal combustion engine probe to establish a gas concentration of a gas mixture, said probe comprising at least one pump electrode, wherein the method comprises the following steps: controlling a first pump current (IP1) at the at least one pump electrode in such a way that a first pump voltage (V1) is obtained, controlling a second pump current (IP2) at the at least one pump electrode in such a way that a second pump voltage (V2) is obtained, said second pump voltage being greater than the first pump voltage (V1), establishing an aging factor for the probe on the basis of the first pump current (IP1) and the second pump current (IP2), and adapting a characteristic of the probe on the basis of the established aging factor.

In some embodiments, the second pump voltage (V2) is chosen in such a way that the latter suffices to decompose the water contained in the air into oxygen and hydrogen.

In some embodiments, the first pump voltage (V1) is chosen in such a way that the latter does not suffice to decompose the water contained in the air into oxygen and hydrogen.

In some embodiments, the aging factor is established as follows:

$$a = \frac{\frac{IP2 - IP1}{C_{H_2O}} + \frac{IP1}{C_{O_2}}}{0.21}$$

where:

a is the aging factor of the probe,
IP1 is the first pump current,
IP2 is the second pump current,
$C_{H_2O}$ is a proportionality factor between the water concentration and the pump current, and
$C_{O_2}$ is a proportionality factor between the oxygen concentration and the pump current.

Some embodiments include following the control of the first pump current (IP1) and second pump current (IP2), controlling a third pump current (IP3) in such a way that the first pump voltage (V1) is obtained, wherein the characteristic of the probe is only adapted once the third pump current (IP3) is determined as deviating from the first pump current (IP1) by less than a predetermined threshold.

In some embodiments, the predetermined threshold is approximately 5%, preferably approximately 1%, more preferably approximately 0.5%, of the first pump current (IP1).

In some embodiments, the aging factor is filtered by means of a low-pass filter for the purposes of determining a filtered aging factor.

In some embodiments, the probe is detected as being faulty if the filtered aging factor drops below a predetermined aging threshold.

In some embodiments, the method is implemented during an overrun cut-off phase of the internal combustion engine.

In some embodiments, the method is implemented independently of the air composition in relation to the water vapor pressure and a reference vapor pressure.

BRIEF DESCRIPTION OF THE DRAWINGS

Further features and objects of the teachings herein will become apparent to a person skilled in the art when considering the single FIGURE, which has been appended. The FIGURE shows a flowchart of an example method incorporating teachings of the present disclosure.

DETAILED DESCRIPTION

The teachings of the present disclosure may be embodied in a method including adapting a characteristic of the probe independently of the immediate conditions, wherein, in particular, an additional humidity sensor or a pre-set condition, such as the presence of a reference vapor pressure or a water-vapor-saturated gas, for example, need not necessarily be present. In some embodiments, a pump current may be applied to the probe, e.g. during an overrun cut-off phase of the internal combustion engine, by means of which pump current, in addition to the oxygen present, all water present can be decomposed into oxygen and hydrogen, wherein, in turn, the oxygen that was decomposed from the water can be ionized and pumped out.

Consequently, in the case of a non-defective probe, this pump current should indicate an oxygen value of approximately 21% since this is the standard proportion of oxygen in the air. In the case of an aged and/or defective sensor, the pump current may indicate a lower oxygen concentration. However, using the methods taught herein, the corresponding aging factor can be determined therefrom and the sensor can continue to be operated with the greatest possible accuracy under an adaptation of the characteristic by means of the aging factor.

In some embodiments, a method for operating an internal combustion engine probe may establish a gas concentration of a gas mixture, said probe comprising at least one pump electrode. Some embodiments may include controlling a first pump current at the at least one pump electrode in such a way that a first voltage is obtained, controlling a second pump current at the at least one pump electrode in such a way that a second voltage is obtained, said second voltage, at least in part, being greater than the first voltage, establishing an aging factor for the probe on the basis of the first pump current and the second pump current, and adapting a characteristic of the probe on the basis of the established aging factor.

In some embodiments, controlling the first pump current and the second pump current and establishing the aging factor for the probe can be implemented independently of the prevailing conditions in the gas mixture, in particular in relation to a reference vapor pressure or a water-vapor-saturated gas mixture.

In some embodiments, the second pump voltage is chosen in such a way that the latter suffices to decompose the water contained in the air in a gaseous state into oxygen and hydrogen. Further, the second pump current ionizes all of the oxygen, i.e., the oxygen originally present and the oxygen obtained from the decomposition of water at the pump electrode, and said oxygen can then diffuse through the solid electrolyte or be pumped thereout.

In some embodiments, the first pump voltage is selected in such a way that the latter does not suffice to decompose water. That is to say, the first pump current at the pump electrode only ionizes the oxygen that is originally present and there is no decomposition of water into oxygen and hydrogen.

As a result of the described selection of the first pump voltage and the second pump voltage, the water content in the gas mixture can be determined and consequently compensated by way of a corresponding subtraction of the corresponding first and second pump currents. In particular, the second pump voltage is embodied to additionally decompose the water in addition to the oxygen present in the gas mixture. Consequently, the second pump current corresponding to the second voltage should indicate a value corresponding to an oxygen concentration of approximately 21%, independently of the humidity in the gas mixture. However, if the corresponding second pump current deviates from the 21% to be displayed, an aging factor of the probe can be established with the aid of the present method and said aging factor can be used to adapt the characteristic of the probe. Here, the invention is based on the discovery that the aging factor of the probe has a similar effect on both the first pump current and the second pump current.

In some embodiments, the aging factor can be established as follows:

$$a = \frac{\frac{IP2 - IP1}{C_{H_2O}} + \frac{IP1}{C_{O_2}}}{0.21}$$

where:

a is the aging factor of the probe,
IP1 is the first pump current,
IP2 is the second pump current, $C_{H_2O}$ is a proportionality factor between the water concentration and the pump current, and $C_{O_2}$ is a proportionality factor between the oxygen concentration and the pump current.

In some embodiments, a method includes following the control of the first pump current and second pump current, controlling a third pump current in such a way that the first pump voltage is obtained. The characteristic of the probe is only adapted once the third pump current is determined as deviating from the first pump current by less than a threshold. In some embodiments, it is possible to ensure that the gas mixture is in a virtually stable state and no dynamics are present within the gas mixture. By way of example, what could be subsumed by dynamics is that the internal combustion engine is in a dynamic state, for example that unwanted constituents are present in the gas mixture, such as fuel, for example.

In some embodiments, the aforementioned threshold is approximately 5%, approximately 1%, and/or approximately 0.5%, of the first pump current. Consequently, if the threshold is exceeded, the assumption can be made that the gas mixture is subject to dynamics and consequently it is impermissible to establish the aging factor and adapt the characteristic of the probe, or this should not be implemented.

In some embodiments, the aging factor is filtered by means of a low-pass filter for the purposes of determining a filtered aging factor. The consequently established filtered aging factor then can be used during normal operation of the internal combustion engine for correcting or adapting the oxygen concentration established by means of the pump current. By way of example, in the simplest case, the measured pump current can be divided by the filtered aging factor during the normal operation of the internal combustion engine and can then be converted into an oxygen concentration or lambda by way of a characteristic.

In some embodiments, a method includes detecting the probe as being faulty if the filtered aging factor drops below a predetermined aging threshold. As a result of the division by the filtered aging factor, already mentioned above, the adaptation of the characteristic would become too large and would lead to inaccurate adapted and compensated measurement results of the probe, should the predetermined aging threshold be undershot. Consequently, the probe should be detected as faulty should this predetermined aging threshold be undershot and this will require a replacement of the probe, for example.

In some embodiments, the established (unfiltered) aging factor can already be subjected to a test of its validity. By way of example, the probe can be detected as being defective if the established (unfiltered) aging factor exceeds a predetermined value. In such a configuration, the step of filtering the aging factor by means of the low-pass filter can be dispensed with since the probe can already be detected as being faulty at this time.

In some embodiments, various elements of the methods herein may be implemented during an overrun cut-off phase of the internal combustion engine. In particular, the assumption can be made during such an overrun cut-off phase of the internal combustion engine that there is virtually only air in the inlet tract and in the exhaust tract of the internal combustion engine and consequently a stable state is present. Should introduced dynamics be detected, for example if the overrun cut-off phase is interrupted prematurely, the adaptation method of the probe characteristic according to the present disclosure should be terminated and should not be implemented.

In some embodiments, an oxygen sensor is arranged in an inlet tract of an internal combustion engine. However, it should be expressly noted here that the method described herein can be further used, for example, with a nitrogen oxide sensor with a linear lambda probe measurement capability.

The method according to the FIGURE starts at step 100 and then reaches step 110, it being determined there whether the internal combustion engine is in a predetermined, adaptation-capable operational state, during which an adaptation of the characteristic of the oxygen sensor can be implemented. By way of example, there is a query in step 110 as to whether the internal combustion engine is in an overrun cut-off phase or an engine run-on. During an engine run-on, the adaptation can only occur if the exhaust gas is virtually nitrogen-oxide-free at the sensor position.

If the internal combustion engine being in an adaptation-incapable operational state is determined in step 110, the method reaches step 140 and is terminated. If the internal combustion engine being in an adaptation-capable operational state is determined in step 110, the method reaches step 112.

In step 112, a first pump current IP1 is controlled at a pump electrode of the oxygen sensor during the overrun cut-off phase of the internal combustion engine in such a way that a first pump voltage V1 is obtained by the time the first pump current IP1 is in a steady state. In some embodiments, the first pump voltage V1 is selected in such a way that the first pump current at the pump electrode only ionizes the oxygen originally present in the air and that the oxygen obtained from a decomposition of water, contained in the air, into oxygen and hydrogen is not ionized. By way of example, the first pump voltage lies in a range between approximately 400 mV and approximately 500 mV, in particular at approximately 450 mV.

In subsequent step 114, a second pump current IP2 is controlled at the pump electrode of the oxygen sensor in such a way that a second pump voltage V2 is obtained, said second pump voltage being substantially greater than the first pump voltage V1. In some embodiments, the second pump voltage V2 corresponds to the maximum applicable voltage and it is selected in such a way that, in addition to the oxygen originally present in the air, the oxygen obtained from the decomposition of water into oxygen and hydrogen is also ionized by means of the second pump current at the pump electrode. In particular, the second pump voltage V2 is sufficient to decompose the water that is present in the air in a gaseous state into oxygen and hydrogen. By way of example, the second pump voltage V2 lies in a range between approximately 800 mV and 1000 mV, in particular at approximately 900 mV.

Thus, when the first pump voltage V1 is controlled to reach the second pump voltage V2, the first pump current IP1 is increased to the second pump current IP2.

In subsequent step 116, a third pump current IP3 is controlled in such a way at the pump electrode of the oxygen sensor that the first pump voltage V1 is obtained again. As already described above, the first pump voltage V1 lies in a range between approximately 400 mV and approximately 500 mV, preferably at approximately 450 mV.

The respective pump voltages V1, V2, V3 may be controlled until the respective pump current IP1, IP2, IP3 has reached steady state and consequently remains virtually constant. By way of example, the respective pump current can be assumed to be constant if the deviation from the mean within a predetermined period of time, e.g., 1 second, is less than 1%, and may be less than 0.5%.

In step 120 there is a query as to whether the third pump current IP3 deviates from the first pump current IP1 by a predetermined threshold. In particular, querying the deviation of the pump currents IP1 and IP3 controlled at two different times serves to check whether the suctioned air in the inlet tract and exhaust tract of the internal combustion engine is in a static state. More precisely, the query in step 120 serves to determine whether or not the internal combustion engine still is in the overrun cut-off phase. Thus, if the first pump current IP1 and the third pump current IP3 are virtually identical, it is possible to determine that the internal combustion engine still is in the overrun cut-off phase or was in the overrun cut-off phase without interruption during the self-diagnosis. If the third pump current IP3 deviates from the first pump current IP1 by the predetermined threshold, it is possible to deduce that the internal combustion engine is no longer in a static state and/or the air mixture at the probe position still contains nitrogen oxide or fuel.

If the third pump current IP3 deviates from the first pump current IP1 by more than the predetermined threshold as determined in step 120, the method reaches step 140 and it is terminated. However, if the third pump current IP3 deviates from the first pump current IP1 by less than the predetermined threshold as determined in step 120, the method reaches step 122.

An aging factor a of the oxygen sensor is determined in step 122. By establishing the first pump current IP1 and the second pump current IP2, it is possible to determine the water content in the air by way of forming the difference between these two pump currents. In particular, as already mentioned above, the second pump voltage V2 is selected in such a way that the water present in the air can be decomposed into oxygen and hydrogen at the pump electrode by means of the second pump current IP2, wherein the oxygen from the decomposed water is decomposed at the pump electrode together with the oxygen originally present in the air and said oxygen will be able to diffuse in the oxygen sensor or be pumped out as oxygen ions. In contrast thereto, the first pump voltage V1 is selected in such a way that only the oxygen originally present in the air is decomposed and there cannot be any decomposition of the water contained in the air. Consequently, the humidity of the air can be deduced by forming the difference between the two pump currents IP1 and IP2.

The aging factor a has an equal effect on the first pump current IP1 when determining the oxygen concentration in the air and on the second pump current IP2, which serves to determine the humidity in conjunction with the first pump current IP1.

Below, formulae (I), (II), (III), and (IV) represent the relationship between the oxygen concentration, the first pump current IP1, the second pump current IP2, and the oxygen or water component in the air:

$$IP1 = a \cdot C_{O_2} \cdot O_2 \tag{I}$$

$$IP2 = a \cdot C_{O_2} \cdot O_2 + a \cdot C_{H_2O} \cdot H_2O \tag{II}$$

$$\Delta IP = IP2 - IP1 = a \cdot C_{H_2O} \cdot H_2O \tag{III}$$

$$O_2 + H_2O = 21\% \tag{IV}$$

where:
a is the aging factor of the probe,
IP1 is the first pump current,
IP2 is the second pump current,
$O_2$ is the oxygen concentration in the air (during the overrun cut-off phase of the internal combustion engine)
$H_2O$ is the water concentration in the air (during the overrun cut-off phase of the internal combustion engine)
$C_{H_2O}$ is the proportionality factor between the water concentration and pump current (IP2−IP1) caused by ionization of oxygen obtained from the decomposition of water, and
$C_{O_2}$ is a proportionality factor between oxygen concentration and pump current (IP1) caused by ionization of oxygen originally present.

The aging factor a can be established as follows by mathematically solving the system of equations of formulae (I), (II), (III), and (IV):

$$a = \frac{\frac{IP2 - IP1}{C_{H_2O}} + \frac{IP1}{C_{O_2}}}{0.21} \tag{V}$$

The aging factor calculated by means of formula (V) can then be used for adapting the oxygen sensor characteristic. Here, the established aging factor may be filtered by way of a low-pass filter during each overrun cut-off phase and applied to adapt the oxygen sensor characteristic. During normal operation of the oxygen sensor, the filtered aging factor then can be used to correct the measured oxygen concentration by way of the pump current. In the simplest case, the measured pump current during normal operation of the oxygen sensor is divided by the filtered aging factor and then assigned to the corresponding oxygen concentration by way of the characteristic.

By way of example, the aging factor to be currently used can be determined as follows using formula (VI):

$$a_{aktuell} = a_{alt} + F \cdot (a_{neu} - a_{alt}) \tag{VI}$$

where:
$a_{aktuell}$ is the current aging factor,
$a_{alt}$ is a previously established aging factor,
$a_{neu}$ is a newly established aging factor, and
F is a weighting factor for the low-pass filter (as a rule, between 0 and 1).

In subsequent step 130, there is a query as to whether the filtered aging factor drops below a predetermined aging threshold. Checking the undershoot is indebted to the fact that the filtered aging factor is divided, as described above, for the purposes of determining the oxygen concentration.

If the filtered aging factor is determined as dropping below the predetermined aging threshold in step 130, the method reaches step 134, where the oxygen sensor is diagnosed as faulty. After step 134, the method reaches step 140 and it is terminated.

However, if the filtered aging factor is not dropping below the predetermined aging threshold in step 130, the method reaches step 132 and the filtered aging factor is used to adapt the characteristic of the oxygen sensor and the established oxygen concentration during normal operation of the oxygen sensor until a further, next aging adaptation according to the present method according to the invention is implemented on the oxygen sensor. As described above, various methods incorporating the teachings herein may include the second pump voltage V2 being controlled to a higher value when the second pump current IP2 is applied. Here, this second pump current should indicate virtually 21%, since both the oxygen from the air and the oxygen decomposed from water is pumped out and should arrive at this percentage. However, if the second pump current shows a lower value, this lower value is assumed to be 21% and the further measurement values of the oxygen sensor adapted accordingly. The sensor is only diagnosed as faulty in the case of an adaptation lying above a threshold (see step 134 in the FIGURE). In this case, it may be necessary to replace the oxygen sensor.

As already described above, the methods described herein in references to the FIGURE can also be used in a nitrogen oxide sensor with a linear lambda probe measurement capability. Here, the pump current from the first chamber is controlled by the reference voltage in the second chamber in such a way that the reference voltages in the first chamber lie firstly at 450 mV, for example, and, secondly, at 900 mV, for example. Here too, an aging factor can be determined, in turn, from the pump current and the pump current difference in the overrun cut-off phase, said aging factor being able to be converted by means of a low-pass filter into a filtered aging factor and the characteristic of the nitrogen oxide sensor being able to be adapted accordingly.

What is claimed is:

1. A method for operating an internal combustion engine having probe measuring a gas concentration of a gas mixture, said probe comprising a pump electrode, the method comprising:
   controlling a first pump current at the pump electrode to provide a resulting first pump voltage;
   controlling a second pump current at the pump electrode to provide a resulting second pump voltage, wherein the second pump voltage is greater than the first pump voltage;
   calculating an aging factor for the probe on the basis of the first pump current and the second pump current;
   following the control of the first pump current and second pump current, controlling a third pump current to provide the first pump voltage; and
   adapting operation of the internal combustion engine based on a characteristic of the probe corresponding to the calculated aging factor only if the third pump current deviates from the first pump current by less than a predetermined threshold.

2. The method as claimed in claim 1, wherein the second pump voltage is high enough to decompose water contained in the gas mixture into oxygen and hydrogen.

3. The method as claimed in claim 1, wherein the first pump voltage is not high enough to decompose water contained in the gas mixture into oxygen and hydrogen.

4. The method as claimed in claim 1, wherein calculating the aging factor includes using the formula:

$$a=((IP2-IP1)/C_{(H\_2O)}+IP1/C_{(O\_2)})/0.21$$

where:
a is the aging factor of the probe,
IP1 is the first pump current,
IP2 is the second pump current,
$C_{(H\_2O)}$ is a proportionality factor between a water concentration and the pump current, and
$C_{(O\_2)}$ is a proportionality factor between an oxygen concentration and the pump current.

5. The method as claimed in claim 1, wherein the predetermined threshold is approximately 5% of the first pump current.

6. The method as claimed in claim 1, further comprising filtering the aging factor with a low-pass filter to determine a filtered aging factor.

7. The method as claimed in claim 6, further comprising identifying the probe as faulty if the filtered aging factor drops below a predetermined aging threshold.

8. The method as claimed in claim 1, wherein the method is implemented during an overrun cut-off phase of the internal combustion engine.

9. The method as claimed in claim 1, further comprising implementing the method independently of an air composition in relation to a water vapor pressure and a reference vapor pressure.

* * * * *